United States Patent [19]

Williams

[11] 3,783,308

[45] Jan. 1, 1974

[54] FLIP-FLOP ELEMENT

[75] Inventor: Clark R. Williams, Dallas, Tex.

[73] Assignee: Texas Instruments Incorporated, Dallas, Tex.

[22] Filed: June 19, 1972

[21] Appl. No.: 264,216

[52] U.S. Cl. .............. 307/291, 307/299 A, 307/318, 307/285

[51] Int. Cl. .......................................... H03k 3/286

[58] Field of Search ................ 307/291, 292, 299 A, 307/285, 318

[56] References Cited

UNITED STATES PATENTS

| | | | |
|---|---|---|---|
| 3,560,766 | 2/1971 | Moore | 307/291 |
| 3,654,493 | 4/1972 | Kardash | 307/291 X |
| 3,676,712 | 7/1972 | Schendel | 307/291 |

*Primary Examiner*—John S. Heyman
*Attorney*—Harold Levine et al.

[57] ABSTRACT

Flip-flop circuits are defined by bipolar elements including multiple emitter transistors, Schottky diodes and multiple emitter Schottky transistors configured to operate with a supply voltage of only 1 volt. The circuits are well adapted for use in devices such as electronic wrist watches when implemented in integrated circuit form wherein current sources are used in place of high value resistors.

7 Claims, 4 Drawing Figures

FLIP-FLOP ELEMENT

Low powered electronically controlled timekeeping devices have been described in the literature. For example, one such device is described in U. S. Pat. No. 3,560,998 and U. S. Pat. No. 3,505,804.

There have been proposals which suggest utilizing CMOS (complementary metal oxide semiconductor) technology in combination with liquid crystal displays primarily due to the power savings capability of such a configuration. Certain advantages, however, may be obtained utilizing bipolar technology for implementing the circuit logic of electronic watches; however, readily available battery sources provide on the order of one volt and it is exceedingly difficult to implement logic with bipolar integrated circuits using such voltage levels. Additional limitations are imposed due to integration requirements, these primarily being that it is difficult to obtain large resistances in integrated circuit format.

An electronic watch overcoming many of the above-mentioned problems is disclosed in U. S. Pat. Application SN 264,212 filed June 19, 1972 by Clark R. Williams and Robert H. Schnurr for Electronic Time-Keeping System, which disclosure is hereby incorporated herein by reference.

Briefly, in accordance with that invention, a timekeeping device is provided which includes a battery operated bipolar integrated circuit for regulating display of the time, including means for displaying and independently setting the calendar date. A crystal controlled oscillator generates a master frequency. This frequency is applied to a frequency divider comprising a ripple counter of toggle flip-flops effective to produce a one hertz system clock signal. The toggle flip-flops respectively comprise bipolar transistors in a circuit configuration effective to operate from voltage sources which provide on the order of one volt. The system clock is applied to a series of counters and decode logic to effect generation of signals to drive circuitry for application to a liquid crystal display. Circuit means are provided for producing current sources in lieu of high value external resistors. The current sources are independent of supply voltage fluctuations and load changes.

Accordingly, it is a principal object of the present invention to provide a master-slave flip-flop circuit which is well adapted for use in integrated circuits operating on a supply voltage on the order of 1 volt.

Figure 1:
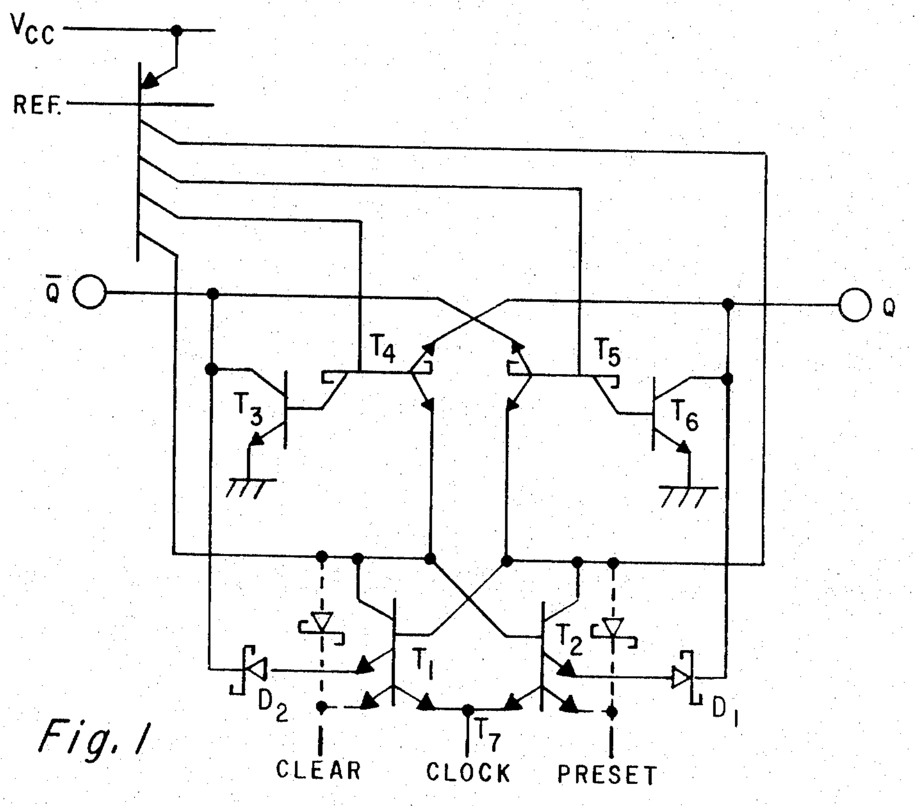
Figure 2:
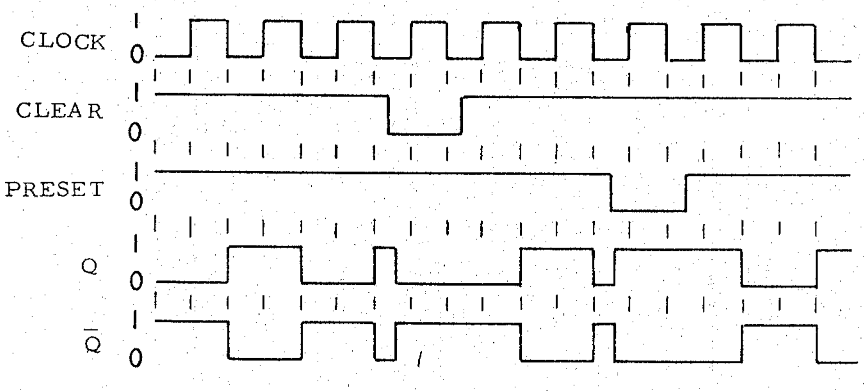
Figure 3:
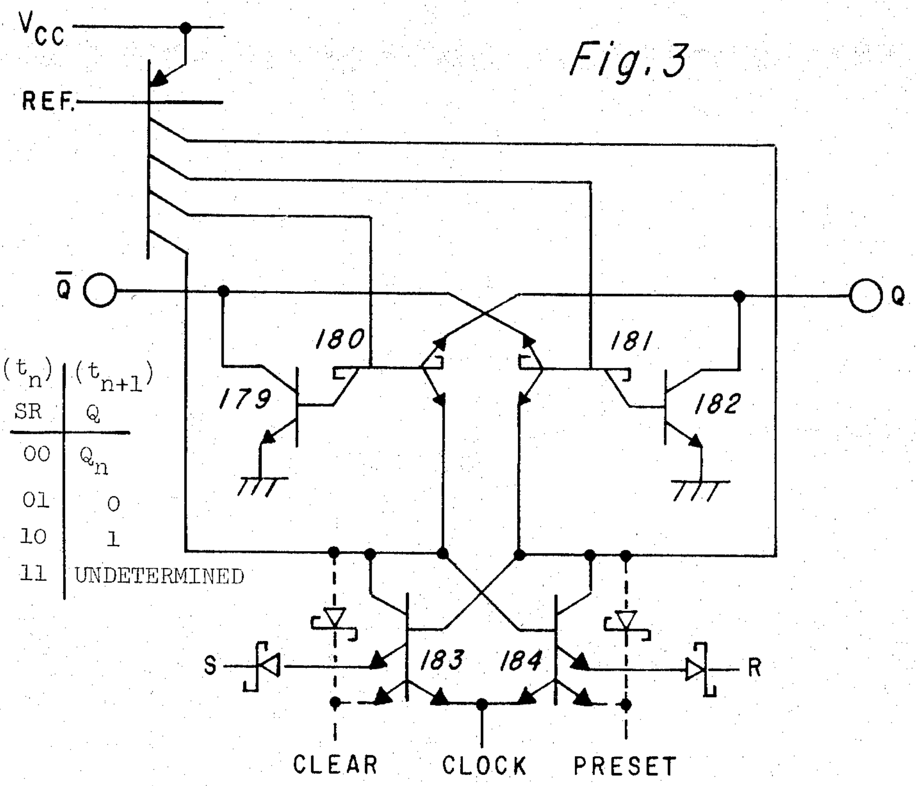
Figure 4:
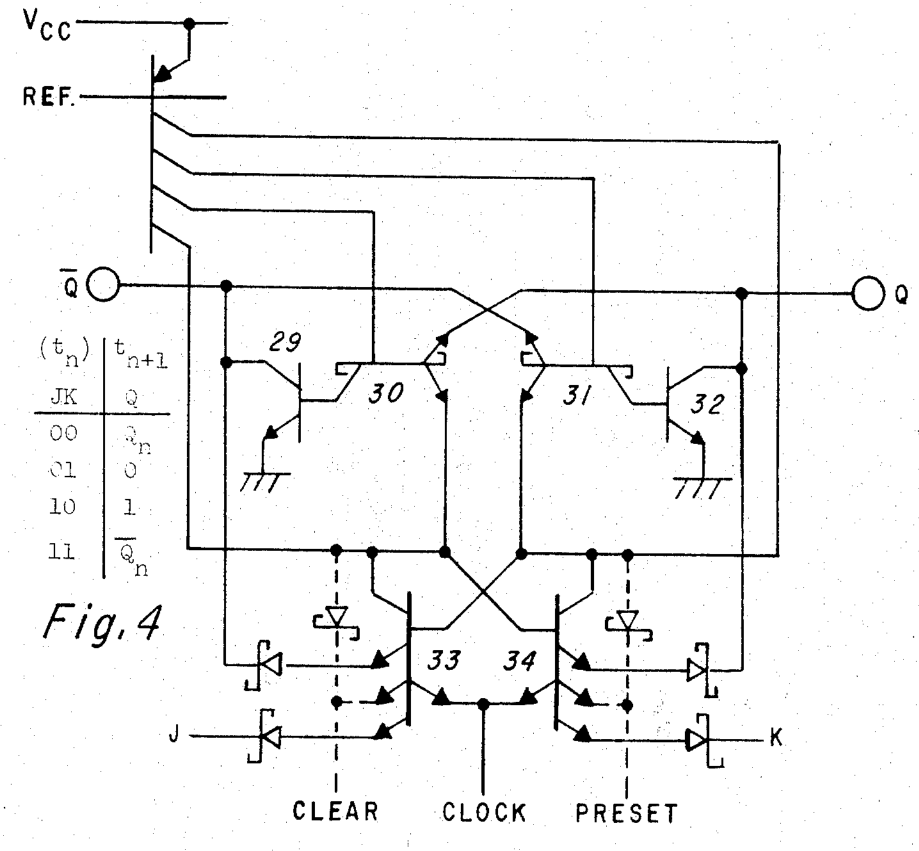

Other objects and advantages of the invention will be apparent upon reading the following detailed description of illustrative embodiments in conjunction with the drawings wherein:

FIG. 1 schematically depicts a toggle flip-flop in accordance with the present invention;

FIG. 2 depicts the waveforms applied to the various terminals of the toggle flip-flop illustrated in FIG. 1;

FIG. 3 schematically illustrates an RS flip-flop in accordance with the present invention;

FIG. 4 schematically illustrates a JK flip-flop in accordance with the invention.

First, operation of the toggle flip-flop will be described. With reference to FIGS. 1 and 2, the toggle flip-flop comprises a bipolar master-slave floating master d.c. coupled flip-flop. Conventional bipolar flip-flops for low voltage application are a.c. coupled. In the present system, however, where operation is required in the 1 volt supply range, it was not possible to construct a standard d.c. coupled circuit since two base-emitter junctions plus a current source could not be fitted into the one volt supply. Further, the 1 volt supply limitation precludes a flip-flop configuration which includes a base-emitter junction, a base-collector junction and a current source. The flip-flop in accordance with the present invention utilizes a Schottky clamped base-collector junction and at the operating current level utilized, a current source, a base-collector junction with a Schottky clamp and a base-emitter voltage are fitted into the 1 volt supply limitation.

With reference to the toggle flip-flop, transistors T1 and T2 define the master of the flip-flop while transistors T3, T4, T5 and T6 define the slave. In operation, assume that transistor T6 is biased in the on condition such that its collector is close to ground, receiving current through the cross-coupling from one of the emitters on Schottky transistor T4. Therefore, no base drive current is available for transistor T3 and therefore the collector of T3 is in the high state since T3 is biased off. Now assume that the clock, clocking transistor T7, is off. In this case, the master will move toward the supply $V_{CC}$ and be clamped through the emitter on transistor T2 through the Schottky diode D1 that goes into the collector of transistor T6. This causes transistor T2 to turn on, which diverts the base drive from transistor T1 through the emitter of T2 to ground through the Schottky diode D1 and the collector-emitter path of transistor T6. When transistor T7 turns on to clock the flip-flop, the current is transferred from one emitter to the other emitter of transistor T2 and flows out the clock line. When the collector potential of T7 approaches ground potential, then the saturated voltage of the collector of T7 plus the collector-emitter potential of saturated T2 is applied to an emitter on transistor T5. The base current of transistor T5 flows out of this emitter through the two saturated transistors T2 and T7 to ground. This deprives transistor T6 of base drive, thereby biasing it off, allowing the collector T6 to go high. This allows two high potentials to be applied to the emitters of Schottky transistor T4 and the base drive of transistor T4 now flows out its collector and into the base of transistor T3, biasing T3 on. The flip-flop is now in a stable state. If the clock transistor T7 turns off, the potential at the master will rise and this time be clamped through the emitter on T1 through the Schottky diode D2 that is connected to the collector of transistor T3. This causes the master to be in the opposite state from that which it occupied previously. When the clock again goes low, it transfers and pulls current out of one of the emitters of transistor T4 through transistors T1 and T7. This in turn deprives transistor T3 of base drive, allowing its collector to go high and there are two highs on the emitter of transistor T5. The base current for T5 now flows into T6 and it turns on again, completing one complete toggle cycle.

The function of the "clear" input is to cause the Q output to go to zero. The function of the preset is to cause the Q output to go to a logic 1. The logic levels going into the "clear" or "preset" have a slight priority with respect to the clock. They are all fed by saturated transistors. For a clock to take place, the preset and clear signals must both be high. For a preset or clear to occur, it is desirable for the clock to be high. This is illustrated in the waveform of FIG. 2.

With reference to FIG. 3, there is illustrated a schematic of an RS flip-flop which may be utilized in accordance with the present invention. Here the master of the flip-flop comprises transistors 183 and 184 while the slave is made up of transistors 179, 180, 181 and 182. As may be seen, transistors 180 and 181 are Schottky transistors. Operation of the RS flip-flop illustrated in FIG. 3 is very similar to the operation of the toggle element described with reference to the description of FIG. 1. With reference again to FIG. 2, the Schottky diode connected between the collector of transistor 183 and the clear line is added to insure that the first flip-flop of a shift counter, for example, will be able to clear. This is accomplished since this diode deprives base drive from transistor 184 thereby insuring that the master of the flip-flop is able to reach a state in which transistor 183 is turned on.

With reference now to FIG. 4, there is illustrated a JK flip-flop bipolar embodiment in accordance with the present invention. The JK flip-flop is advantageously utilized as a part of counter logic in an electronic watch. Circuit operation of the JK flip-flop is the same as that of the toggle element previously described with reference to FIG. 1 with the exception that two more emitters, one on each side of the master, (transistors 33 and 34) have been added along with corresponding Schottky diodes.

While various embodiments have been described in detail herein, it will be apparent to those skilled in the art that various changes may be made without departing from the spirit or scope of the invention.

What is claimed is:

1. A master-slave floating master DC coupled flip-flop circuit comprising:

a. a master section having first and second transistors of the multiple emitter type, and at least four Schottky diodes the collectors of each of each first and second transistors being connected to respective constant current sources and to the base of the other of said first and second transistors, an emitter of each of said first and second transistors being connected to a clock pulse input, another emitter of said first transistor being connected to a clear pulse input and to the cathode of a first Schottky diode, the anode of which is connected to the collector of said first transistor, another emitter of said second transistor being connected to a preset pulse input and to the cathode of a second Schottky diode, the anode of which is connected to the collector of said second transistor, a third emitter of said first transistor being connected to the anode of a third Schottky diode, the cathode of which is connected to a pulse source, a third emitter of said second transistor being connected to the anode of a fourth Schottky diode, the cathode of which is connected to a pulse source, and b. a slave section comprising third and fourth transistors of the multiple emitter Schottky type and fifth and sixth transistors, the emitters of said fifth and sixth transistors being connected to a reference potential, the bases of said third and fourth transistors being connected to respective constant current sources, the collector of said third transistor being connected to the base of said fifth transistor, the collector of said fourth transistor being connected to the base of said sixth transistor, one emitter of said third transistor being connected to the collector of said first transistor, one emitter of said fourth transistor being connected to the collector of said second transistor, another emitter of said third transistor being connected to the collector of said sixth transistor and another emitter of said fourth transistor being connected to the collector of said fifth transistor.

2. A flip-flop circuit as defined in claim 1 wherein the cathode of said third Schottky diode is connected to the collector of said third transistor and the cathode of said fourth Schottky diode is connected to the collector of said sixth transistor.

3. The flip-flop circuit as defined in claim 1 wherein said constant current sources are derived from a supply voltage of approximately 1 volt.

4. The flip-flop circuit as defined in claim 1 wherein said flip-flop is an RS flip-flop and the R and S inputs comprise the cathodes of said third and fourth Schottky diodes respectively.

5. The flip-flop circuit as defined in claim 4 wherein said constant current sources are derived from a supply voltage of approximately 1 volt.

6. The flip-flop circuit as defined in claim 2 wherein said flip-flop is a JK flip-flop having fifth and sixth Schottky diodes, said circuit having its J input connected to the cathode of a fifth Schottky diode, the anode of which is connected to still another emitter of said first transistor and said K input is connected to the cathode of a sixth Schottky diode, the anode of which is connected to still another emitter of said second transistor.

7. The flip-flop circuit as defined in claim 6 wherein said constant current sources are derived from a supply voltage of approximately 1 volt.

* * * * *